United States Patent Office 3,304,296
Patented Feb. 14, 1967

3,304,296
PARA-ARYLAZOPHENYLMETHYLOXYCARBONYL GROUPS AS AMINO PROTECTING GROUPS IN PEPTIDE SYNTHESIS
Robert Schwyzer, Riehen, Karl Zatskó and Peter Sieber, Basel, and Heini Kappeler, Bettingen, Switzerland, assignors to Ciba Corporation, New York, N.Y., a corporation of Delaware
No Drawing. Filed Nov. 7, 1963, Ser. No. 322,044
Claims priority, application Switzerland, Aug. 30, 1957, 49,962
7 Claims. (Cl. 260—112.5)

This is a continuation-in-part of our application Serial No. 755,404, now abandoned, filed August 18, 1958.

This invention provides a method for the temporary blocking, in peptide syntheses, of a free amino group, by acylating it by a new protective group and, after the peptide condensation has been effected, splitting off the acyl group introduced.

The new groups according to the invention are para-arylazophenyl-methyloxycarbonyl groups of the formula aryl—N=N—phenyl—CH$_2$—O—CO—. The term "aryl" means halogenophenyl, lower alkoxyphenyl, naphthyl, halogenonaphthyl or lower alkoxynaphthyl. The halogeno or lower alkoxy substituent is preferably in para-position to the azo group. Of lower alkoxy substituents the methoxy group is preferred, of halogeno substituents the chlorine.

Especially suitable on account of the excellent properties of the derivatives obtained therewith are the p-phenylazo-phenyl-methyloxy-carbonyl group (hereinafter referred to as PZ) and the p-(p'-methoxy-phenylazo)-phenyl-methyloxycarbonyl group (hereinafter referred to as MZ).

The term "temporary blocking" means that, in the synthesis of peptides, in a starting amino acid or peptide or a carboxylic acid derivative thereof, a free amino group which must not participate in the condensation reaction is protected, for instance by acylation, the thus-protected product coupled at the carboxyl end with an amino acid or peptide or derivative thereof exhibiting a free α-amino group to form an amide bond, and that from the condensation product the protecting group is removed. It is possible, of course, to use the condensation product still having the amino group protected as starting material for further condensation reactions with amino acids or peptides as are customary in the synthesis of higher peptides (being built up from a large number of amino acids) and to remove the protective group only at the end of the synthesis.

The carboxylic acid derivatives mentioned above are those which are known to be useful in peptide syntheses for carrying out the condensation reaction. Thus, for instance, the amino acid or peptide which is to be coupled at the carboxyl end with another amino acid or peptide is used in the form of the free acid when the carbodiimide method is used for condensation, or in the form of the azide, when the azide method is used, or in the form of a carboxylic acid or carbonic acid mixed anhydride when the mixed anhydride method is used, or in the form of a reactive ester, viz. a methyl or phenyl ester substituted by an electron-attracting substituent that is to say a meta-directing substituent, for instance cyanomethyl ester, carbethoxymethyl ester, or para-nitrophenyl ester. On the other hand, the amino acid or peptide which is to be coupled by means of the free group can be any carboxylic acid derivative, for instance a lower alkyl or phenyl lower alkyl, especially a benzyl, para-nitrobenzyl, para-halogenobenzyl or para-lower alkoxybenzyl ester, or an activated ester as defined above or an amide, hydrazide or anhydride. It should be noted that the kind of carboxylic acid derivative and the manner of condensation are immaterial with regard to the protection of the amino group involved here. Also, it is immaterial whether the amino acids or peptides to be condensed contain, besides the para-arylazophenylmethyloxycarbonyl - protected amino group further protected functional groups, for instance an acylated hydroxy group.

By the term "amino acid" in this application are understood the so-called natural amino acids, viz. those amino acids which are formed in the hydrolysis of naturally occurring peptides and proteins, for instance glycine, alanine, valine, leucine, serine, crysteine, methionine, ornithine, lysine, arginine, aspartic acid, asparagine, glutamic acid, glutamine, proline, histidine, tryptophane, phenylalanine, tyrosine and other α-amino acids. The amino group to be protected is the α-amino group or an amino group present in the side chain, for instance the ε-amino group of lysine. The amino group to be protected is a primary amino group except in the case of pyroline where the α-amine group is a secondary amino group. If desired, the α-amino group and any amino group of the side chain can be protected by the same protecting group. As to the configuration of the amino acids defined, it can be the L- or D-configuration, the configuration being irrelevant in the protection of the amino group.

The term "peptide" means peptide built up from the natural amino acids as defined.

The temporary protection of amino groups plays an important role in the synthesis of peptides. A rather large number of protective groups are known, for example the tosyl, the trityl and the carbobenzoxy group.

A problem in the synthesis of higher peptides, for instance those having 5 or more amino acid radical, is that the products protected by the known protective groups are not crystallizable. Purification of these products is therefore difficult. In the synthesis of higher peptides, more than in other fields of synthetic chemistry, it is extremely important that the intermediates can be obtained in a high degree of purity. If the intermediates crystallize, their purification by recrystallization is rather simple.

A subject of the invention is the provision of blocking groups which increase the crystallizability of amino acids or peptides to which they are attached. Another advantage of these protective groups is that they render the products having these protective groups colored. Thus, if the intermediates do not crystallize and their purification must be effected by means of multiplicative distribution or by chromatography the colored substance can easily be localized and its concentration can be determined colorimetrically.

Moreover, introduction and splitting off of the new protective groups can be readily effected.

The introduction of the protective group takes place by reaction of the corresponding halides, such as bromides, iodides and preferably chlorides, for example p-phenylazo-phenyl-methyloxy-carbonyl chloride with the amino acid or peptide to be protected, preferably in the presence of organic or inorganic basic agents, such as carbonates or hydroxydes of alkali or earth alkali metals or tertiary amines. Of particular value has proved working in pyridine or in water-dioxane mixtures with the addition of alkalies, magnesium oxide or triethylamine. The reactions also take place, however, in ether-caustic alkali mixtures. The reaction takes place very smoothly and with very good yield even at room temperature.

The products obtained when amino acids or peptides are acylated with para-arylazophenyl-methyloxycarbonyl halides are—from the reasons named above—valuable intermediates in the synthesis of peptides and proteins, for instance of gramicidin, tyrocidin, hypertensin, corticotropin; thus, for example, the arylazophenyl-methyloxycarbonyl derivatives of L-phenylalanine, L-aspartic acid β-methyl ester, L-glutamic acid γ-methyl ester can be used in the synthesis of the crystalline protected pentapeptide ester L-phenylalanyl-D-phenylalanyl-L-aspartyl-L-glutamyl-L-tyrosine para-nitro-phenyl ester which itself is useful as intermediate in the synthesis of tyrocidin A as illustrated in the examples. An example for the protection of amino groups in the side chain is the $N^\epsilon$-[p-(p'-methoxyphenylazo)-benzyloxycarbonyl]-L-lysine which can be used in the synthesis of bis-homo-gramicidin S, cyclo - (L - valyl - L - lysyl - L - leucyl - D - phenylalanyl - L - prolyl - L - valyl - L - lysyl - L - leucyl - D-phenylalanyl-L-prolyl) as shown in U. S. patent application Serial No. 809,355 of Robert Schwyzer, filed April 28, 1959, now U.S. Patent No. 3,211,716.

The splitting off of the protective groups takes place under mild conditions in a manner analogous to the splitting off of the carbobenzoxy group in the presence of hydrolyzing or reducing agents, for example by acid hydrolysis, especially with dilute hydrobromic acid in glacial acetic acid, or by hydrogenation, for example with hydrogen in presence of a catalyst.

The para - arylazophenyl - methyloxy - carbonyl halides used for introduction of the protective groups are new compounds. The chlorides are obtained, for example, from the corresponding arylazophenyl carbinols by reaction with phosgene in dioxane solution. p-Phenylazo-phenylmethyloxy-carbonyl chloride and p-(p'-methoxyphenylazo)-phenylmethyloxy-carbonyl chloride, for example, are well defined crystalline and stable compounds which are obtained in good yield.

The alcohols used as starting materials are preferably obtained starting from aminophenyl carbinols. These can be reacted with nitroso-aryl compounds, such as nitrosobenzene. Substituted arylazophenyl carbinols can also be obtained by diazotization of the aminobenzyl alcohol, coupling with phenols and subsequent conversion of the hydroxyl group. The diazotization, for example, of the very acid-sensitive p-aminobenzyl alcohol takes place in good yield by dropwise introduction of an aqueous solution of equimolecular quantities of the amino alcohol and sodium nitrite into ice cold hydrochloric acid. The coupling with phenol or α-naphthol takes place in the customary manner, the quantity of sodium hydroxide solution being so selected that the pH at the end of the reaction amounts to about 6–8. The methylation of the phenolic hydroxyl groups of the azo compound takes place, for example, in dioxane-caustic alkali mixtures by means of dimethyl sulfate at boiling temperature.

The following examples illustrate the invention:

EXAMPLE 1

*p-Phenylazo-benzyloxycarbonyl glycine*

75 mg. of glycine are dissolved in 2 ml. of N-NaOH and treated with a solution of 280 mg. of p-phenylazo-benzyloxycarbonyl-chloride in 2 ml. of ether. The mixture is shaken for ½ hour at room temperature, whereby the color for the most part passes into the aqueous phase. This is washed several times with ether and then acidified with dilute HCl. The separated derivative is filtered with suction (270 mg.=86%) and crystallized from ethyl acetate and petroleum ether and from methanol and water, M.P. 179–182° C.

$\lambda_{max.} = 322 m\mu$, $E_{1\ cm.}^{1\ mol.} = 19500$

The p-phenylazo-benzyloxycarbonyl chloride used as starting material is prepared as follows:

(a) *p-Phenylazo-benzyl alcohol.* — 7.7 grams of p-aminobenzyl alcohol are introduced with stirring and ice cooling into a solution of 7.4 grams of nitrosobenzene in 40 ml. of glacial acetic acid. After 10 minutes a crystalline deposit commences to separate and after 3 hours this is filtered with suction and washed with glacial acetic acid-water; yield 3.18 grams, M.P. 141–142° C. The filtrate is treated with much water and the separated brown material filtered with suction and washed with water. By extraction by boiling with carbon tetrachloride and crystallization from this solvent, a total quantity of 6.5 grams (48%) of p-phenylazo-benzyl alcohol is obtained; M.P. 142.5–143° C. Drying is carried out for 5 hours at 90° C. under 0.1 mm. pressure.

The ultra-violet spectrum in $CH_2Cl_2$ shows two maxima (1)                      322 m$\mu$  ($\epsilon$=18500)

(2)                      425 m$\mu$  ($\epsilon$=650)

(b) *p-Phenylazo-benzyloxycarbonyl chloride.* — 10.9 grams of phosgene are dissolved in 40 ml. of dioxane and treated at 0° C. with 5 grams of p-phenylazo-benzyl alcohol. The mixture is stirred for 15 minutes at 0° C. and then allowed to stand for 3 hours at room temperature. The solution is filtered from a small quantity of dark flakes and evaporated to dryness under vacuum. The red residue crystallizes completely and is recrystallized from absolute petroleum ether. 5.73 grams (88%), M.P. 82–83° C. Drying is carried out for 5 hours at 60° C. under $10^{-2}$ mm. pressure.

The ultra-violet spectrum in $CH_2Cl_2$ shows two bands (1)                      321 m$\mu$  ($\epsilon$=20100)

(2)                      437 m$\mu$  ($\epsilon$=500)

EXAMPLE 2

*p-(p'-Methoxyphenylazo)-benzyloxycarbonyl glycine*

75 mg. of glycine are reacted, as described in Example 1, with 2 ml. of N-NaOH and 310 mg. of p-(p'-methoxyphenylazo)-benzyloxycarbonyl chloride in 2 ml. of ether. Similar working up gives 310 mg. (90%) of p-(p'-methoxyphenylazo)-benzyloxycarbonyl glycine. Crystallization takes place from methanol-water and from ethyl acetate-petroleum ether.

M.P. 176–177° C. $\lambda_{max.} = 346 m\mu$, $E_{1\ cm.}^{1\ mol.} = 23000$

The p - (p' - methoxyphenylazo) - benzyloxycarbonyl chloride is prepared as follows:

(a) *p-Hydroxyphenylazo-benzyl alcohol.*—710 mg. of p-aminobenzyl alcohol and 430 mg. of 98% $NaNO_2$ are dissolved in a mixture of 4 ml. of ethanol and 2 ml. of $H_2O$. The solution is added dropwise within 10 minutes with stirring to 8.7 ml. of 2N-HCl at 0° C. After a further 5 minutes the solution, likewise with ice cooling and stirring, is added dropwise to a solution of 550 mg. of phenol in 5.5 ml. of 2.1 N-NaOH. The pH, which at the end of the introduction is 5, is adjusted with sodium bicarbonate solution to 7–8. After 10 minutes at 0° C., the red precipitate is filtered with suction, dried and recrystallized from ethanol-water; 1.09 grams (=83%) brown red crystal leaflets, M.P. 189.5–190.5° C. Drying is carried out for 4 hours at 80° C. under 0.1 mm. pressure. The ultra-violet spectrum in ethanol shows 2 maxima:

(1)                      240 m$\mu$  ($\epsilon$=12650)

(2)                      352 m$\mu$  ($\epsilon$=27800)

(b) *p-Methoxyphenylazo-benzyl alcohol.*—9.38 grams of p-hydroxyphenylazo-benzyl alcohol are dissolved in a mixture of 50 ml. of dioxane and 8.5 ml. of 4.9 N-sodium hydroxide solution and treated at boiling temperature with 7.8 ml. of dimethyl sulfate. After the strongly exothermic reaction has subsided a further 4.25 ml. of 4.9 N-NaOH are added dropwise. After the mixture has become acid again (5 minutes), the same quantity of sodium hydroxide solution is again added. After 1 hour under reflux the solution is then still alkaline. It is now treated at 80° C. with a methanol-water mixture (1:3) until crystallization is distinctly observed. After the whole has cooled, the orange red, fine crystal leaflets are filtered with suction and washed with methanol-water and water. 9.15 gram (=92%), M.P. 131–133° C. After repeated recrystallization from methanol-water, the melting point amounts 133.5–134.5° C. The ultra-violet spectrum in ethanol shows 2 maxima:

(1)                239 m$\mu$  ($\epsilon$=12800)

(2)                348 m$\mu$  ($\epsilon$=20500)

(c) *p - Methoxyphenylazo - benzyloxycarbonyl chloride.*—10.15 grams of p-methoxyphenylazo-benzyl alcohol are introduced at 0° C. with stirring into a solution of 9.4 grams of phosgene in 40 ml. of dioxane and then the whole allowed to stand at room temperature for 3 hours with frequent swirling. After evaporation under vacuum, the residue is extracted by boiling several times with hexane. From the hot, filtered solution there crystallize 9.5 grams (=74%) of orange yellow needles, M.P. 87–88.5° C. A test portion is recrystallized 3 times from petroleum ether, M.P. 88.5–89.5° C. Drying is carried out for 20 hours at 20° C. under 0.2 mm. pressure over $P_2O_5$.

EXAMPLE 3

*p-(p'-Methoxyphenylazo)-benzyloxycarbonyl-L-proline*

115 mg. of proline are reacted as described in Example 2 with 2 ml. of N-sodium hydroxide solution and 310 mg. of p-(p'-methoxyphenylazo)-benzyloxy-carbonyl chloride in 2 ml. of ether. Similar working up gives 333 mg. (=87%) of p-(p'-methoxyphenylazo)-benzyloxy-carbonyl-proline, M.P. 165–167° C.

$$\lambda_{max.}=346 m\mu, E^1_{1\,cm.}\,^{mol.}=19000$$

EXAMPLE 4

*p-(p'-Methoxyphenylazo)-benzyloxycarbonyl-L-glutamic acid γ-methyl ester*

198 mg. of L-glutamic acid γ-methyl ester hydrochloride are dissolved in 7 ml. of pyridine and treated with 305 mg. of p-(p'-methoxyphenylazo)-benzyloxycarbonyl chloride. After 1 hour at room temperature, the solution is poured into excess of cold hydrochloric acid and the derivative filtered with suction; 382 mg. (=83.5%). M.P. 123–125° C.

EXAMPLE 5

*p-(p'-Methoxyphenylazo)-benzyloxycarbonyl-L-arginine*

5.25 grams of L-arginine hydrochloride are dissolved in a mixture of 20 ml. of N-NaHCO$_3$, 7.5 ml. of 4N-NaOH and 16.5 ml. of dioxane and treated, in 5 portions with a solution of 7.6 grams of p-(p'-methoxyphenylazo)-benzyloxycarbonyl chloride in 35 ml. of dioxane and 6.25 ml. of 4N-NaOH. After ½ hour the whole is adjusted to pH=7 and the separated crystalline product filtered off. 10.1 grams (=91%), M.P. 222–223° C. (from dimethylformamide-water).

By recrystallization from 15% acetic acid, the acetate is obtained, M.P. 223–224° C. (with decomposition).

$$\lambda_{max.}=346, E^1_{1\,cm.}\,^{mol.}=21600 \text{ (methanol)}$$

EXAMPLE 6

*p-(p'-Methoxyphenylazo)-benzyloxycarbonyl-L-phenylalanine*

165 mg. of L-phenylalanine are suspended in a mixture of 1 ml. of water and 4 ml. of dioxane and stirred for ¼ hour with 200 mg. of magnesium oxide. After addition of 305 mg. of p-(p'-methoxyphenylazo)-benzyloxycarbonyl chloride, stirring is continued for 1 hour at room temperature. The solution containing suspended MgO is introduced dropwise with stirring into 100 ml. of N-HCl. The separated, crystalline derivative is filtered with suction and recrystallized from ethyl acetate-petroleum ether and methanol-water. M.P. 157–158° C.; 380 mg. (=91.5%).

In an analogous manner the reaction can be conducted with p-(4-methoxynaphthylazo)-benzyloxycarbonyl chloride. The starting material is prepared as follows:

(a) *p-(4-Hydroxynaphthylazo)-benzyl alcohol.*—1.59 grams of p-aminobenzyl alcohol and 960 mg. of 98% NaNO$_2$ are dissolved in 15 ml. of water and added dropwise at 0–5° C. with stirring to 19.4 ml. of 2N-HCl. The diazonium salt solution produced is then, likewise at 0–5° C., added dropwise to a solution of 1.9 grams of α-naphthol in 13 ml. of 2.1 N-NaOH. The precipitate is then filtered with suction and thoroughly washed with water. Drying is carried out under vacuum at 70° C.; 3.52 grams (=98%), M.P. 213° C. with decomposition. A test portion is recrystallized from ethanol-water. Small, red brown lustrous crystals, M.P. 215–217° C. with decomposition.

(b) *p-(Methoxynaphthylazo)-benzyl alcohol.*— 1 gram of p-(4-hydroxynaphthylazo)-benzyl alcohol is dissolved, with the addition of a few drops of water, in a mixture of 5 ml. of dioxane and 0.74 ml. of 4.9 N-caustic soda solution and the solution heated to boiling. After the addition of 0.67 ml. of dimethyl sulfate (under reflux) at intervals of 5 minutes a further 0.33 ml. of 4.9 N-NaOH are added twice. After 1 hour under reflux, the solution is treated with methanol-water (1:3) to the point of crystallization. After cooling, the whole is filtered with suction and washed with methanol-water (1:1) and (1:2). 840 mg. (=80%) of brown needles, M.P. 131–133° C. A test portion is recrystallized from carbon tetrachloride and twice from methanol-water M.P. 138–139° C. The ultra-violet spectrum in ethanol shows 3 maxima:

(1) 236 m$\mu$ ($\epsilon$=21400)

(2) 270 m$\mu$ ($\epsilon$=12700)

(3) 390 m$\mu$ ($\epsilon$=16200)

(c) *p - (4 - Methoxynaphthylazo)-benzyloxycarbonyl chloride.*—550 mg. of p-(4-methoxynaphthylazo)-benzyl alcohol are introduced at 0° C. into a solution of 660 mg. of phosgene in 4 ml. of dioxane and the whole maintained for 15 hours at 0° C. The solvent is evaporated under vacuum and the residue extracted by boiling with petroleum ether. After separation of a black resin, the petroleum ether is evaporated. The residual chloride is a dark red oil solidifying to crystals after some time. 490 mg. (=73%).

EXAMPLE 7

*Splitting up of the p-(p'-methoxyphenylazo)-benzyloxycarbonyl group*

A test portion of 50 mg. of the p-(p'-methoxyphenylazo)-benzyloxycarbonyl-L-phenylalanine is dissolved in 2 ml. of an 0.5 N-colorless solution of HBr in glacial acetic acid and maintained for 4 hours at 35° C. The solvent is then evaporated under vacuum and the residue treated with water and ether. The ethereal layer becomes red colored. On shaking with dilute NH$_3$-solution no color passes into the aqueous phase, an indication that the splitting off is complete. Evaporation of the acid aqueous layer gives L-phenylalanine hydrobromide in crystalline form.

In an analogous manner the p-phenylazo-benzyloxycarbonyl residue and also the p-(4-methoxynaphthylazo)-benzyloxycarbonyl group can be split off.

This example is intended merely to illustrate how the protective groups can be split off. The method can in analogy may be used for the splitting off of these protective groups from peptides obtained by condensing L-phenylalanine having the α-amino group protected in the way described with another amino acid or a peptide.

EXAMPLE 8

*p-(p'-Methoxyphenylazo)-benzyloxycarbonyl-phenylalanylphenylalanine ethyl ester (L.D)=MZ-Phe-Phe-OEt (L.D)*

(a) 20 grams of MZ-L-phenyl-alanine (prepared as described in Example 6), 10.6 grams of D-phenylalanine ethyl ester hydrochloride, 240 ml. of absolute tetrahydrofurane and 22.6 ml. of triethylamine are cooled to −15° C. with stirring, and after 1 hour 6.4 ml. of phosphorous oxychloride in 40 ml. of absolute tetrahydrofurane added at that temperature. The mixture is then stirred for 2 hours at room temperature. The precipitated product is suction filtered, washed with ethyl acetate and water and dried at 60° C. under reduced pressure. Weight=19.5 grams; M.P. 170–172° C.

The filtrate is washed with 2N-hydrochloric acid and ammonia (1 part of concentrated ammonia+25 parts of water), dried and then evaporated and the precipitate suction-filtered. A second fraction of 5.9 grams is obtained; M.P. 175–177° C.; yield: 25.4 grams=90%.

For the purpose of analysis the product is recrystallized from ethyl acetate: M.P. 179° C.

(b) *MZ-Phe-Phe-OH (L.D)*

24 grams of MZ-Phe-Phe-OEt are dissolved in 1.1 liters of dioxane, 240 ml. of methanol and 200 ml. of water with heating, cooled to room temperature and then 198 ml. of 1 N-sodium hydroxide solution are added. After allowing the reaction mixture to stand for one hour at room temperature, it is concentrated under reduced pressure until turbidity sets in, water is added and the mixture acidified with 2 N-hydrochloric acid. The precipitate is suction-filtered, washed and dried. Yield: 20.2 grams=88% of the theoretical yield; M.P. 189–190° C. (with decomposition). For the purpose of analysis the product is recrystallized from methanol and a little water. M.P. 189–190° with decomposition. If desired, the MZ-group can be split off according to the method described in Example 7 to yield L-phenylalanyl-D-phenylalanine. The protected product can be used for further condensation as shown, for instance, in Example 11.

EXAMPLE 9

*p-(p′-Methoxyphenylazo) - benzyloxycarbonyl - γ-carbomethoxy-glutamyl - O-acetyl-tyrosine-nitrobenzyl ester (L.L)=MZ-Glu(γOMe)-Tyr(Ac).OCH₂C₆H₄NO₂ (p) (L.L)*

(a) 22.5 grams of O-acetyl-tyrosine-nitrobenzyl ester hydrobromide, 22.0 grams of MZ-glutamic acid-γ-methyl ester (prepared as described in Example 4), 220 ml. of absolute tetrahydrofurane and 25 ml. of triethylamine are cooled to −15° C. 7 ml. of phosphorus oxychloride in 20 ml. of absolute tetrahydrofurane are added dropwise with stirring after 1 hour, and the whole is stirred for 1 hour at −15° C. and for 1 hour at room temperature. The reaction mixture is dissolved in 1 liter of carbon tetrachloride-chloroform (1:1), extracted twice with a mixture of 1 N-hydrochloric acid and methanol (1:1) and twice with a mixture of water and methanol (1:1), dried and evaporated to dryness. The residue is boiled with 330 ml. of methanol, cooled, and any insoluble matter suction-filtered. The product is boiled again with 200 ml. of ethanol, 60 ml. of water are added to the hot solution and the mixture allowed to crystallize. There are obtained 22.8 grams=58% of the theoretical yield: M.P. 145–150° C.

The product can be converted into the hydrobromide as follows:

*HBr-H-Glu(γOMe)-Tyr(Ac)-ONB (L.L)*

(b) 19.8 grams of MZ-Glu(γOMe)-Tyr(Ac)-ONB are dissolved in 39 ml. of glacial acetic acid, 39 ml. of 4N HBr in glacial acetic acid are added and the whole is heated for one hour at 40° C. The glacial acetic acid is then evaporated at 40° C. under reduced pressure, the residue dissolved in a mixture of carbon tetrachloride and chloroform (1:1) and methanol and water (1:1), and the lower phase extracted twice with a mixture of methanol and water (1:1). The methanol-water solutions are thoroughly extracted with carbon tetrachloride and chloroform (1:1), then suction-filtered over Celite and evaporated to dryness under reduced pressure. Yield: 11.9 grams=79% of the theoretical yield.

EXAMPLE 10

*p - (p′ - Methoxyphenylazo)-benzyloxycarbonyl-β-carbomethoxy-asparagyl - γ - carbomethoxy-glutamyl-O-acetyl - tyrosine - nitrobenzyl ester (L.L.L)=MZ-Asp(βOMe)-Glu(γOMe)-Tyr(Ac)-ONB (L.L.L)*

(a) From 11.9 grams of HBr-H-Glu(γOMe)-Tyr(Ac).ONB (prepared as described in Example 9(b)) the free dipeptide is prepared with NH₃ in CHCl₃. The dipeptide is dissolved together with 9.3 grams of MZ-Asp(βOMe)OH in 70 ml. of absolute ethyl acetate, cooled to −15° C., 5.3 grams of dicyclohexyl-carbodiimide are added and the whole allowed to stand for one hour at −15° C. After allowing the whole to stand overnight at −5° C., 1 ml. of glacial acetic acid is added and the precipitated dicyclohexyl-urea suction-filtered.

The filtrate is evaporated under reduced pressure, diluted with a mixture of carbon tetrachloride and chloroform (1:1), washed twice with a mixture of methanol and 1N-hydrochloric acid (1:2) and three times with a mixture of methanol and water (1:2), dried and evaporated. The residue is after-acetylated by being allowed to stand with acetic anhydride and pyridine and then evaporated again to dryness. On adding ethyl acetate, 3.88 grams of undissolved matter remain behind: M.P. 170–172° C. From the filtrate 2.12 grams of tripeptide can be obtained after being subjected to chromatography over aluminum oxide (activity III). For the purpose of analysis the tripeptide is recrystallized from a mixture of ethanol and water: M.P. 166–168° C.

The p - (p′-methoxyphenylazo)-benzyloxycarbonyl-β-carbomethoxy-aspartic acid (L)=MZ-Asp(βOMe)OH(L) used as starting material can be prepared as follows:

(b) 4.35 grams of magnesium oxide are added to 10 grams of aspartic acid-β-methyl ester HCl, 18.2 grams to MZ-chloride, 50 ml. of water and 150 ml. of dioxane with stirring and cooling with ice. After stirring for 4 hours at room temperature the mixture is poured into 500 ml. of water, acidified and extracted with ethyl acetate. The ethyl acetate solution is exhaustively extracted with dilute ammonia (1 part of concentrated ammonia +25 parts of water), the latter is acidified again and extracted with ethyl acetate. After evaporating the ethyl acetate the residue is recrystallized from a mixture of methanol and water. Yield: 17 grams=75% of the theoretical yield: M.P. 100–104° C.

For the purpose of analysis the product is recrystallized from methanol and water: M.P. 104–106° C.

From the product obtained according to (a) the MZ-group is split off as follows:

*HBr-H-Asp(OMe)-Glu(OMe)-Tyr(Ac)-ONB*

(c) 6.82 grams of MZ-tripeptide-ONB are dissolved in 11.4 ml. of glacial acetic acid, 11.4 ml. of 4N-hydrobromide in glacial acetic acid are added and the whole kept for 1 hour at 40° C. The glacial acetic acid is evaporated under reduced pressure, and the residue distributed between carbon tetrachloride:chloroform 1:1 and methanol:water 1:2. The lower phase is extracted again with aqueous methanol and the latter is washed several times with carbon tetrachloride-chloroform 1:1. The methanol-water extracts are evaporated to dryness under reduced pressure. Yield: 4.42 grams=82% of the theoretical yield.

EXAMPLE 11

*MZ-Phe-Phe-Asp(OMe)-Glu(OMe)-Tyr(Ac)-ONB*

From 4.4 grams of HBr-tripeptide-ONB (prepared as described in Example 10(c)) the free tripeptide is prepared with ammonia in chloroform. 4 grams of MZ-Phe-phe-OH (prepared as described in Example 8(b)) are dissolved in 100 ml. of boiling absolute ethyl acetate, cooled and added to the above prepared tripeptide. 1.6 grams of dicyclohexyl-carbodiimide are added to the solution at −15° C., allowed to stand for 1 hour at −15° C. and overnight at −5° C. After the addition of 1 ml. of glacial acetic acid, the precipitate consisting of peptide and dicyclo-hexylurea is suction-filtered. The ethyl acetate filtrate is evaporated under reduced pressure, dissolved in a mixture of carbon tetrachloride and chloroform (1:1) and extracted twice with methanol:1N-hydrochloric acid (1:2), then with methanol:water 1:2. The lower phase is evaporated to dryness under reduced pressure, the residue after acetylated together with the above filtered material with acetic anhydride and pyridine. After evaporating the acetic anhydride, the residue is dissolved in boiling dioxane, the dicyclohexylurea suction filtered (1.57 grams=90% calculated on carbodiimide), and the filtrate is filtered through a column of 220 grams of aluminium oxide (activity III). After washing with dioxane, the filtrate is evaporated to dryness under reduced pressure and the residue well triturated with 50 ml. of hot ethanol. After adding an equal quantity of water, the precipitate is suction-filtered. Weight: 5.48 grams=74%, M.P. 176–179° C. For the purpose of analysis the product is recrystallized from a mixture of ethanol and water, M.P. 180–182° C.

If desired, the MZ-group can be split off by means of hydrobromic acid in glacial acetic acid as for instance described in Example 7. The product so-obtained can be condensed with the amino acid sequence of gramicidin S, L-valyl - L - ornithyl-L-leucyl-D-phenylalanyl-L-prolin, having the α-amino group protected, for instance by carbobenzoxy, the condensation product cyclized and the protecting groups removed to yield tyrocidin A of the formula cyclo-(L-valyl-L-ornithyl-L-leucyl - D - phenylalanyl-L-prolyl - L - phenylalanyl - D - phenylalanyl-L-aspartyl-L-glutamyl-L-tyrosyl).

EXAMPLE 12

$N^\epsilon$-[p-(p'methoxyphenylazo)-benzyloxycarbonyl]-L-lysine=$N^\epsilon$-MZ-L-lysine (a) 5 grams of L-lysine monohydrochloride in 150 ml. of water are boiled with 7.5 g. of basic copper carbonate for 2 hours. The undissolved copper carbonate is suction-filtered and washed with hot water. To the deep blue filtrate there are added 200 ml. of acetone and 1.65 grams of magnesium oxide and in the course of 30 minutes, a solution of 10 grams of MZ-chloride in 50 ml. acetone with stirring and cooling with ice. The whole is then stirred for 2 hours at room temperature, 100 ml. of water are added, the precipitate is suction-filtered and washed with water, alcohol and ether. In order to decompose the copper complex the mixture is heated with 75 ml. of 2N-hydrochloric acid for 10 minutes at 60–70° C., the yellow-orange precipitate suction-filtered and washed. Yield: 9.1 grams=81% of the theoretical yield; M.P. 242–243° C. with decomposition.

$N^\epsilon$-MZ-L-lysine-methyl ester HCl (b) 11.2 grams of $N^\epsilon$-MZ-lysine are suspended in 340 ml. of absolute tetrahydrofurane and phosgene is introduced at 40° C. in the course of 1 hour. The majority of the MZ-lysine thereby dissolves to give a red color. The solvent is evaporated to dryness under reduced pressure. Residue: 9.84 grams=83% of the theoretical yield of $N^\epsilon$-MZ-lysine-$N^\alpha$-carboxy-anhydride. The carboxy anhydride is boiled for 5 minutes with 47 ml. of 1N-hydrochloric acid in methanol, then completely evaporated to dryness under reduced pressure. The residue is crystallized from a mixture of methanol and ether. Yield: 7.1 grams=68% of the theoretical yield; M.P.=241° C. with decomposition.

EXAMPLE 13 p-Phenylazo-benzyloxycarbonyl-L-alanine=PZ-L-alanine 90 mg. of L-alanine and 200 mg. of magnesium oxide are triturated and stirred in 1 ml. of water and 4 ml. of dioxane for 15 minutes. 275 mg. of p-phenylazo-benzyloxy-carbonyl chloride are then added in small portions and the whole stirred for 1 hour. The reaction product is added to 80 ml. of 1N-hydrochloric acid and taken up with ethyl acetate. The organic phase is washed twice with the very dilute acetic acid.

To 60 ml. of water there are added 2 ml. of concentrated ammonium hydroxide and with this solution the ammonium salt of the product is prepared. The aqueous ammoniacal salt solution is added dropwise to 80 ml. of 1N-hydrochloric acid. The precipitated derivative is suction-filtered, washed with water and dried. Yield 274 mg.=83%. The product is recrystallized from a mixture of methanol and water. Double melting point: 140–142° C., 158–159° C.

In an analogous manner the PZ-derivatives listed in Table I can also be prepared.

TABLE I

| PZ-derivative of: | Crystallized from: | M.P. |
|---|---|---|
| L-valine | Ethyl acetate-petroleum ether | 124–129 |
| L-proline | Ethanol-water | 129–136 |
| L-phenylalanine | Ethyl acetate-petroleum ether | 164–169 |
| L-tyrosine | Ethanol-water | 157–167 |
| L-tryptophane | Ethyl acetate-petroleum ether | 157–157 |
| L-serine | Ethanol-water | 177–172 |
| L-asparagine | Ethanol | 180–180 |
| L-leucine | Benzene | 109–113 |
| L-methionine | do | 130–133 |
| L-glutamic acid | } do | 119–122 |
| γ-methyl ester [1] | | |

[1] The derivative is prepared in acetone-water instead of in dioxane-water.

EXAMPLE 14 p-(p'-Methoxyphenylazo)-benzyloxycarbonyl-L-valine=MZ-L-valine 118 mg. of valine and 200 mg. of magnesium oxide are well triturated and stirred for 15 minutes in 1 ml. of water and 4 ml. of dioxane. 310 mg. of p-(p'-methoxyphenylazo)-benzyloxy-carbonyl chloride are then added in portions and the whole is stirred for 1 hour. The reaction product is poured into 100 ml. of 1N-hydrochloric acid. The derivative is suction-filtered, washed with water and dried. Yield=339 mg. =88%.

For the purpose of purifying the derivative, it is dissolved in ethanol-water (90:10), and the solution is poured on to a small neutral aluminum oxide column. Impurities are eluted with ethanol-water. Elution is then continued with ethanol-glacial acetic acid-water (70:10:20) and the substance solution collected. The solution is evaporated and taken with 1N-hydrochloric acid and ethyl acetate. The organic phase is washed with water, dried with saturated sodium chloride solution, filtered and evaporated. The product crystallizes from methanol-water: M.P. 134–136° C.

In an analogous manner the following derivatives can be prepared:

TABLE II

| MZ-derivative of: | Crystallized from: | M.P. |
|---|---|---|
| L-alanine | Methanol-water | 162–164 |
| L-serine | Ethanol-water | 166–168 |
| L-methionine | Benzene | 130–132 |
| L-tryptophane [1] | do | 137–139 |

[1] In the case of tryptophane the upper layer of the aluminum oxide column is taken out after elution with ethanol-water and treated with ethanol-glacial acetic acid-water and filtered.

EXAMPLE 15

*p-(p'-Methoxyphenylazo)-benzyloxycarbonyl-(im)-benzyl-L-histidine*

The solution of 2.45 grams of (im)-benzyl-histidine in 22 ml. of 1N-sodium carbonate and 2 ml. of 1N-sodium hydroxide is cooled to 0° C. A solution of 4.02 grams of p-(p'-methoxyphenylazo)-benzyloxy-carbonyl chloride in 20 ml. of dioxane is added dropwise in the course of 30 minutes. The whole is then stirred for 4 hours at room temperature, the reaction mixture is poured into 250 ml. of water and the pH is adjusted to 4 with 2N-hydrochloric acid.

The crystalline precipitate is suction-filtered, washed well with water, methanol and ether and the crude product is dried under reduced pressure. There are obtained 3.24 grams (63%) of crude MZ-(im)-benzyl-histidine; M.P. 211–213° C.

After being recrystallized once from hot N-dimethylformamide-water the product shows a melting point of 225° C.

What is claimed is:

1. In a process for the temporary blocking, in peptide syntheses, of a free amino group by acylating it and, after the peptide condensation has been effected, splitting off the acyl group introduced, the improvement wherein a free amino group not participating in the condensation reaction is acylated with a para-arylazophenyl-methyloxycarbonyl halide in which the aryl substituent is selected from the group consisting of phenyl, halogenophenyl, lower alkoxyphenyl, naphthyl, halogenonaphthyl, and lower alkoxynaphthyl.

2. In a process for the temporary blocking, in peptide syntheses, of a free amino group by acylating it and, after the peptide condensation has been effected, splitting off the acyl group introduced, the improvement wherein a free amino group not participating in the condensation reaction is acylated with a para-arylazophenyl-methyloxycarbonyl chloride in which the aryl substituent is selected from the group consisting of phenyl, halogenophenyl, lower alkoxyphenyl, naphthyl, halogenonaphthyl, and lower alkoxynaphthyl.

3. In a process for the temporary blocking, in peptide syntheses, of a free amino group by acylating it and, after the peptide condensation has been effected, splitting off the acyl group introduced the improvement wherein any free amino group not participating in the condensation reaction is acylated with p-phenylazophenyl-methyloxycarbonyl chloride.

4. In a process for the temporary blocking, in peptide syntheses, of a free amino group by acylating it and, after the peptide condensation has been effected, splitting off the acyl group introduced the improvement wherein any free amino group not participating in the condensation reaction is acylated with p-(p'-methoxyphenylazo)phenyl-methyloxycarbonyl chloride.

5. A member selected from the group consisting of natural amino acids and peptides built up from natural amino acids and protected derivatives thereof wherein a free amino group is substituted with a para-arylazophenyl-methyloxycarbonyl group in which the aryl substituent is selected from the group consisting of phenyl, halogenophenyl, lower alkoxphenyl naphthyl, halogenonaphthyl and lower alkoxynaphthyl.

6. Peptides of the natural amino acids wherein at least one amino group of said peptides is substituted with the p-phenylazophenyl-methyloxycarbonyl group.

7. Peptides of the natural amino acids wherein at least one amino group of said peptides is substituted with the p-(p' - methoxyphenylalzo)-phenyl - methyloxycarbonyl group.

References Cited by the Examiner

UNITED STATES PATENTS

| | | | |
|---|---|---|---|
| 2,373,700 | 4/1945 | McNally et al. | 260—207.1 |
| 2,470,094 | 5/1949 | Dickey et al. | 260—207.1 |
| 2,709,164 | 5/1955 | Weiland | 260—112.5 |
| 2,715,119 | 8/1955 | Weiland | 260—112.5 |
| 3,009,909 | 11/1961 | Kaeding | 260—207 |

ELBERT L. ROBERTS, *Primary Examiner.*

PERRY A. STITH, M. M. KASSENOFF,
*Assistant Examiners.*